United States Patent [19]

Nakamura et al.

[11] Patent Number: 4,469,308

[45] Date of Patent: Sep. 4, 1984

[54] LEVER HOIST

[75] Inventors: Takayoshi Nakamura, Atsugi; Kazuo Maeda, Yokohama; Masayuki Ohno, Tokyo; Teruo Akiyama, Sagamihara, all of Japan

[73] Assignee: Kabushiki Kaisha Kito, Kawasaki, Japan

[21] Appl. No.: 469,654

[22] Filed: Feb. 25, 1983

[30] Foreign Application Priority Data

Mar. 11, 1982 [JP] Japan .................................. 57-37205

[51] Int. Cl.³ ......................... B66F 19/00; B66F 3/30; G05G 1/12; F16D 13/42

[52] U.S. Cl. .................................. 254/350; 254/352; 254/353; 254/357; 74/577 M; 192/43.1; 192/93 A

[58] Field of Search ............... 254/217, 218, 352, 353, 254/354, 369, 350, 357, 346, 347; 74/577 M, 577 SF, 577 S, 577 R; 192/20, 21, 43.1, 93 A, 95

[56] References Cited

U.S. PATENT DOCUMENTS

| | | | |
|---|---|---|---|
| 1,903,218 | 3/1933 | Knight | 254/372 X |
| 2,243,361 | 5/1941 | Stahl | 254/352 |
| 2,827,994 | 3/1958 | Tiedeman et al. | 192/93 A |
| 3,047,114 | 7/1962 | Stevens | 254/352 X |
| 3,100,031 | 8/1963 | Lock | 254/352 X |
| 3,740,146 | 6/1973 | Wilharm | 192/95 X |

FOREIGN PATENT DOCUMENTS 2570 1/1980 Japan .................................. 254/352

*Primary Examiner*—Stuart S. Levy
*Assistant Examiner*—Joseph J. Hail, III
*Attorney, Agent, or Firm*—Sughrue, Mion, Zinn, Macpeak and Seas

[57] ABSTRACT

A lever hoist comprises a change gear provided in a driving shaft for driving a sheave for winding-up a chain or rope for a load, an operating lever rockably driven by a hand, winding-up and winding-off driving pawls engageable with teeth of the change gear and changeable in response to the purpose of hoisting or lowering the load, and a braking assembly for preventing the change gear from being driven by a gravity of the load and having a spring for releasing the braking assembly. According to the invention the lever hoist further comprises a brake spring control member rotatably fitted on the driving shaft, a brake clamping spring arranged between the driving member and the brake spring control member, and a direction change transmission mechanism for transforming rotation of the brake spring control member into axial urging force of the brake clamping spring. The lever hoist is capable of lifting and lowering even a light load by repeatedly rocking the operating lever and includes the brake spring control member which is rotated to release the brake clamping and hence the load sheave into a freely rotatable condition.

8 Claims, 15 Drawing Figures

LEVER HOIST

BACKGROUND OF THE INVENTION

1. Field of the Invention

The present invention relates to a lever hoist for use in lifting, lowering or dragging objects to be transferred by repeatedly rocking a lever of the hoist.

2. Description of the Prior Art

Lever-operated small type hoisting and dragging devices have been known. One of such devices includes an elastic resistance member interposed between a driving member and a driven member for releasing a braking assembly, and an operating lever rockable about the driving member. The operating lever includes a change pawl metal pivotally secured thereto having winding-up and winding-off driving pawls detachably engageable with a change gear on the driving member for respectively driving the change gear in winding-up and winding-off directions.

With this known device, as the elastic resistance member for releasing the braking assembly engages the driving member, a clamping force for the braking assembly is insufficient when a light load is being hoisted. In hoisting such a light load, therefore, when the operating lever is repeatedly rocked, the driving member is returned by a return movement of the operating lever for a next driving movement. Accordingly, such a device cannot hoist a light load. In lowering a light load, on the other hand, a torque resulting from the light load turns a load sheave, with the result that such a light load cannot be lowered by the rocking movement of the operating lever.

SUMMARY OF THE INVENTION

It is an object of the invention to provide an improved lever hoist which eliminates the above disadvantages of the prior art and is capable of lifting and lowering even a light load by repeatedly rocking an operating lever and has a brake spring control member which is rotated to release a brake clamping spring and hence a load sheave into a freely rotatable condition.

A lever hoist including a change gear provided on a driving member threadedly engaged on a driving shaft for driving a sheave about which is wound up a chain, rope or the like for a load, an operating lever rockable about said driving member by hand, a winding-up driving pawl engageable with teeth of said change gear and driven by said operating lever in a winding-up direction for the load, a winding-off driving pawl engageable with the teeth of said change gear and driven by said operating lever in a winding-off direction for the load, and a braking assembly preventing said change gear from being driven from a side of said sheave and having an elastic resistance member directly or indirectly engaging said driving member for releasing said braking assembly. According to the invention, the lever hoist comprises a brake spring control member rotatably fitted on said driving shaft, a brake clamping spring arranged between said driving member and said brake spring control member, and a direction change transmission mechanism for transforming rotation of said brake spring control member into axial urging force of said brake clamping spring.

The invention will be more fully understood by referring to the following detailed specification and claims taken in connection with the appended drawings.

DETAILED DESCRIPTION OF THE PREFERRED EMBODIMENT

Figure 1:
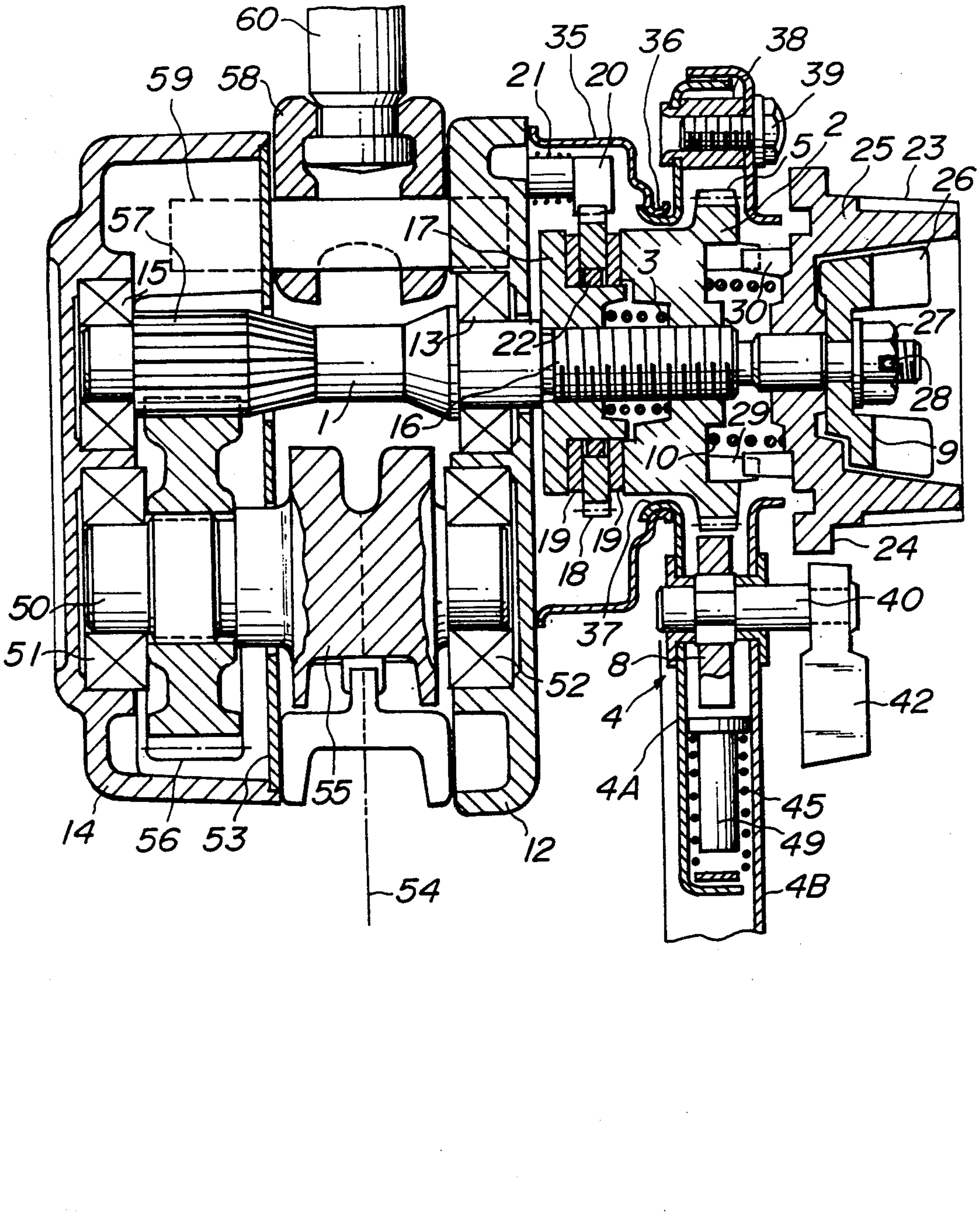
FIG. 1 is a sectional view of a lever hoist of one embodiment of the invention, with a released braking assembly.
Figure 2:
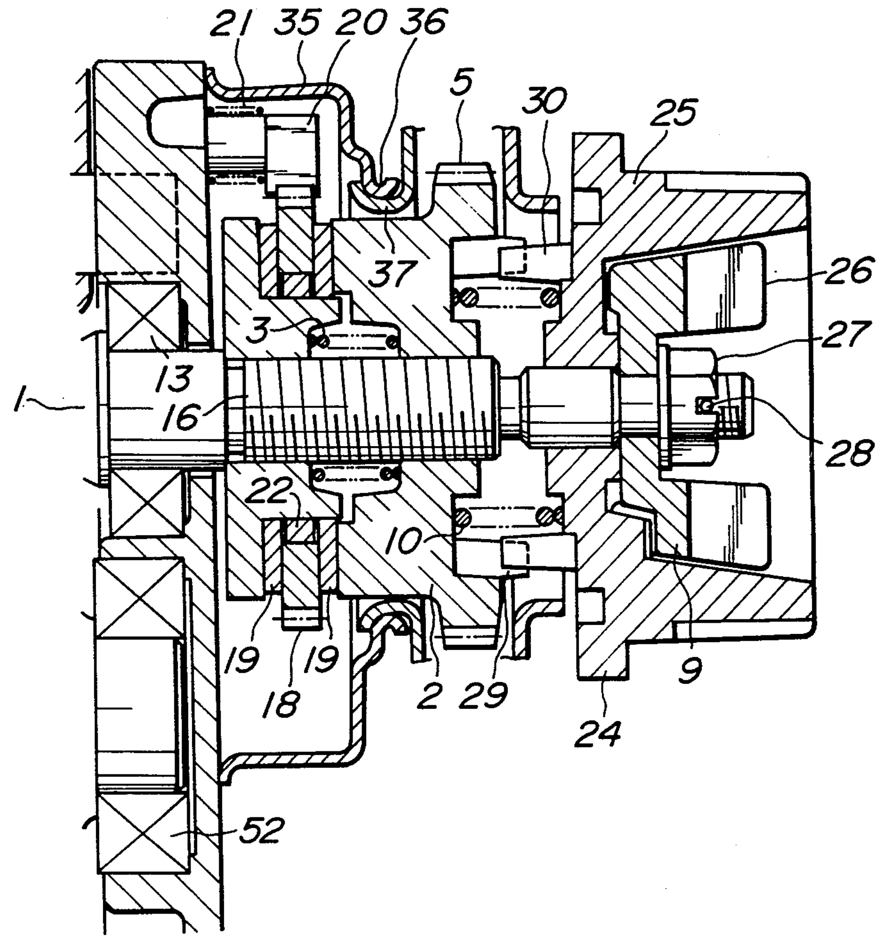
FIG. 2 is an enlarged partial sectional view illustrating a brake spring control member and a braking assembly of the lever hoist shown in FIG. 1.

Referring to FIGS. 1–9 illustrating a first embodiment of the invention, a driving shaft 1 is journaled at its mid portion by a bearing 13 in a frame 12 and has one end journaled by a bearing 15 in a gear box 14 and the other end formed with external screw threads 16 for a braking assembly adapted to be threadedly engaged with internal screw threads of a driving member 2 having change gear teeth 5. A driven member 17 is also threadedly engaged with said external screw threads 16 of the driving shaft 1 between the frame 12 and driving member 2 and abuts against an enlarged diameter portion of the driving shaft 1 journaled by the bearing 13.

Between the driving member 2 and the driven member 17 are interposed a brake ratchet wheel 18 and friction plates 19 abutting against opposite sides thereof. A brake pawl 20 pivotally secured to the frame 12 is brought into engagement with the brake ratchet wheel 18 by an engagement spring 21. The brake ratchet wheel 18 has a center hole within which is fitted an oilless bearing 22 of a sintered alloy. The ratchet wheel 18, friction plates 19 and bearing 22 are fitted on a reduced diameter portion of the driven member 17 to form a braking assembly. Moreover, between the driving and driven members 2 and 17 is interposed a released brake position holding elastic resistance member 3 made of a coil spring which serves to prevent the driving member 2 from moving in its braking direction. In hoisting and lowering a heavy load, the driving shaft 1 tends to be rotated by a gravity of the load, so that when the driving shaft 1 is rotated, the driving member 2 is moved against the coil spring 3 to the left as viewed in FIG. 1 because of the threaded engagement of the driving shaft 1 and driving member 2. Accordingly, the driving member 2 urges the ratchet wheel 18 and friction plates 19 against the driven member so that the driving shaft 1 is prevented from rotating with the aid of the brake pawl 20 connected to the frame 12.

On the other end of the driving shaft 1 are fitted a circular box-shaped spring supporting member 25 having a gripping portion 23 and an engagement flange 24, and a brake spring control member 9 having finger engagement portions 26 arranged within the spring supporting member 25. On the distal end of the driving shaft 1 is threadedly fitted a stopper 27 as a nut which is prevented from loosening by means of locking means 28 such as a split pin or the like passing through the nut and the distal end of the driving shaft 1. The brake spring control member 9 is thus rotatably journaled against axial movement between the stopper 27 and an enlarged diameter portion of the end of the driving shaft 1.

Figure 3:
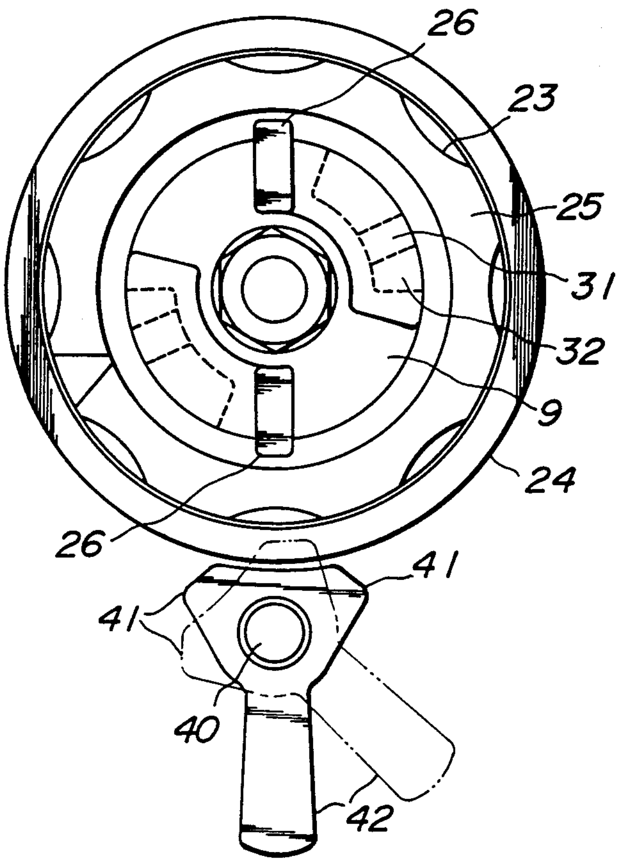
FIG. 3 is a front elevation, partially in section, showing a brake spring control member, spring supporting member with a gripping portion for manually driving and idling change-over preventing engagement member of the lever hoist shown in FIG. 1.
Figure 4:
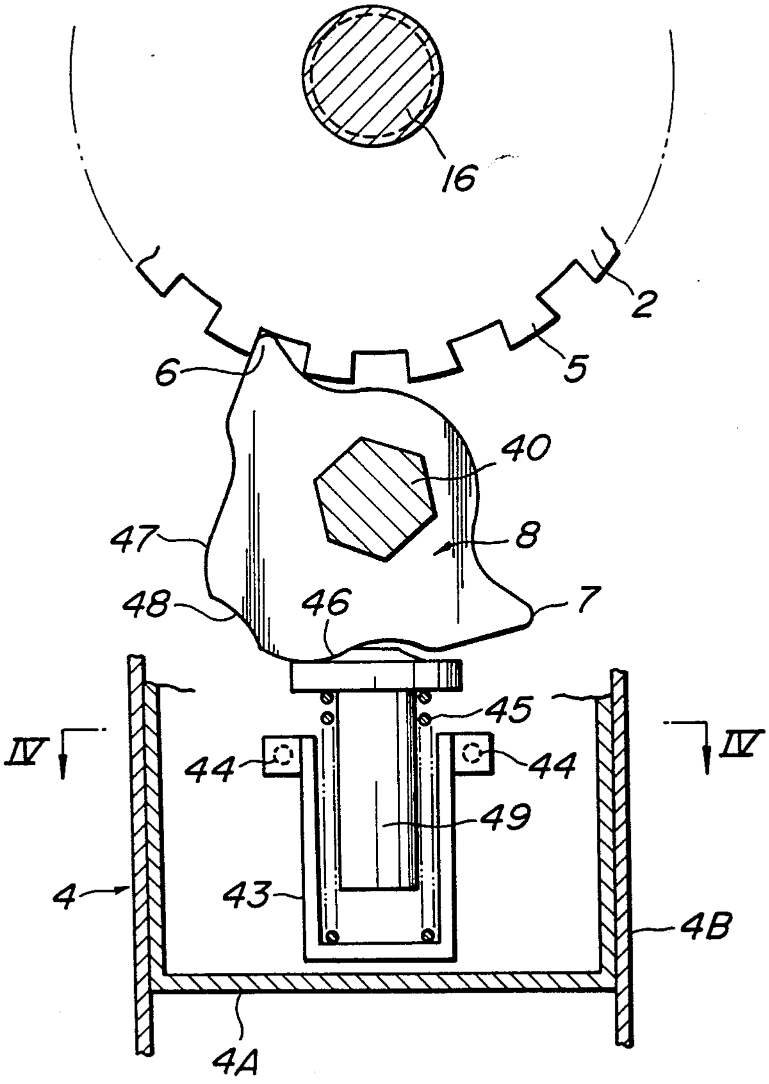
FIG. 4 is a sectional front elevation illustrating a winding-up direction driving pawl engaging a change gear of the lever hoist shown in FIG. 1.
Figure 5:
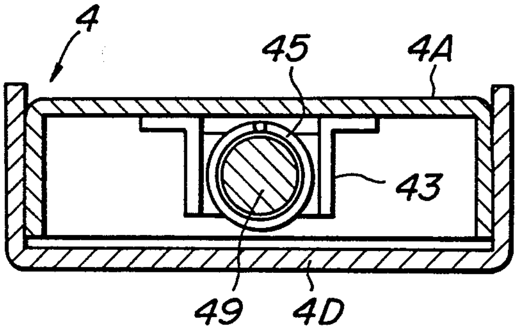
FIG. 5 is a sectional view taken along the line IV—IV in FIG. 4.
Figure 6:
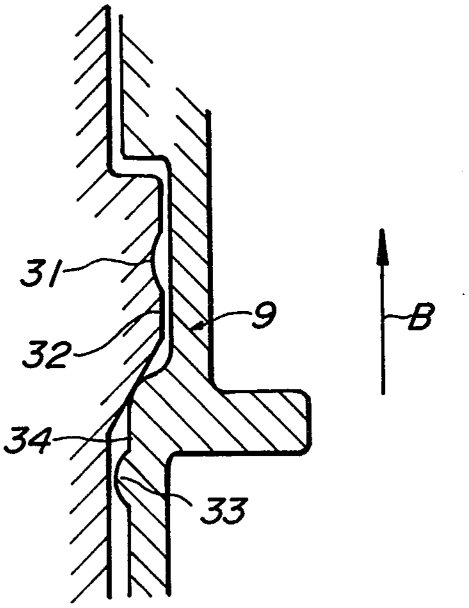
FIG. 6 is a sectional view illustrating a direction change transmission mechanism when the braking assembly is released according to the invention.
Figure 7:
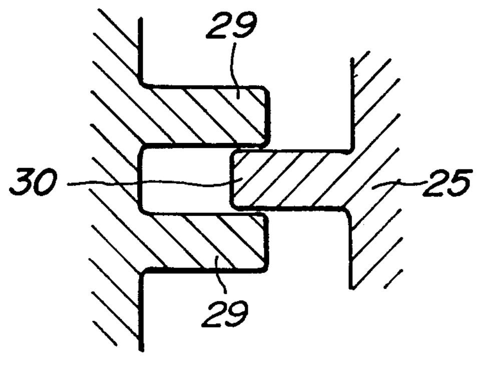
FIG. 7 is a sectional view showing an engaging portion for transmitting rotative movement between the spring supporting member and driving member of the lever hoist shown in FIG. 1.
Figure 8:
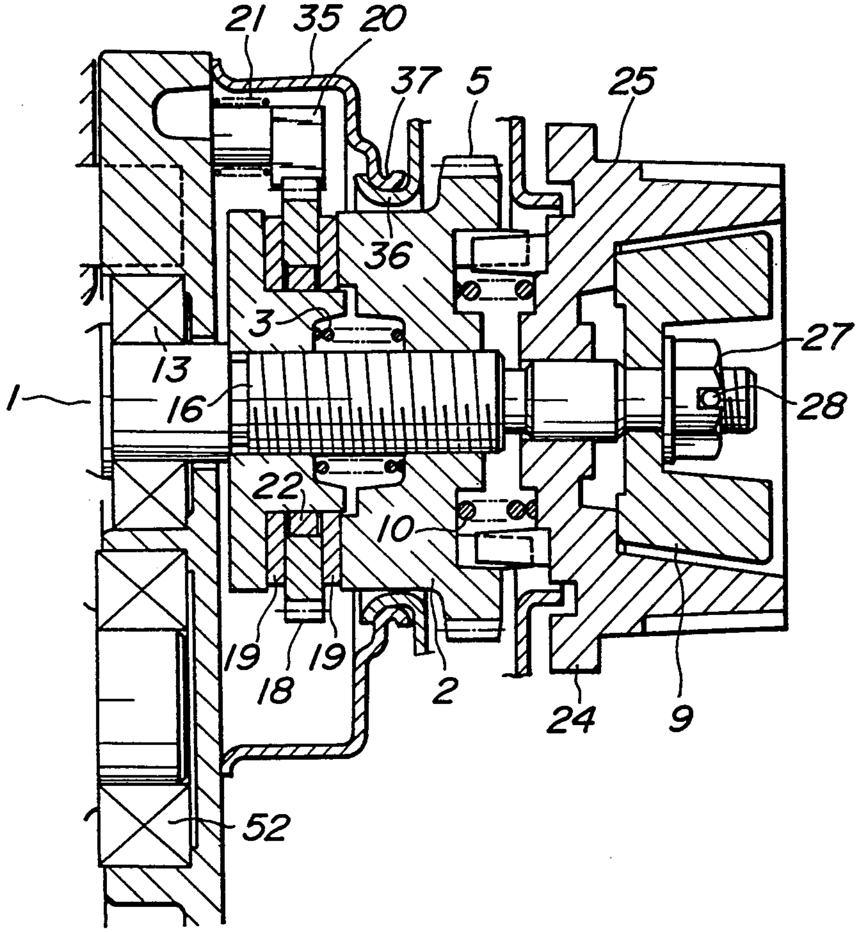
FIG. 8 is an enlarged sectional view of the hoist shown in FIG. 1 illustrating the brake spring control member and the clamped brake assembly.

Between the driving member 2 and the spring supporting member 25 is interposed a coil spring 10 for operating or clamping the brake assembly, which spring 10 is stronger than the above mentioned spring 3. The driving member 2 and the spring supporting member 25 are integrally formed on their opposite surfaces with engagement protrusions 29 and 30 for transmitting rotative movements with each other. The spring supporting member 25 is formed on its inner bottom with cams 32 each having an engagement recess 31 in its surface (FIGS. 3 and 6). The brake spring control member 9 is formed in opposition to the cams 32 with cam followers 34 each having a protrusion 33 adapted to be brought into the recess 31 (FIG. 6). The cams 32 and cam followers 34 form a direction change transmission mechanism for transforming the rotation of the brake spring control member 9 to an axial urging force of the coil spring 10 for operating or clamping the brake assembly in a braking position.

The driven member 17, brake ratchet wheel 18, friction plates 19, brake pawl 20 and part of the driving member 2 are covered by a metal brake cover 35 formed on its one side by pressing with a fixed support ring 36 having a U-shaped cross-section in opposition to an intermediate outer circumferential surface of the driving member 2. An inner lever component member 4A made of metal plates is formed on its intermediate portion adjacent to the brake cover 35 by pressing with a rotatable support ring 37 which is adapted to be fitted in the fixed support ring 36 rotatable but against axial movement relative thereto in a manner enclosing the support ring 36.

Cylindrical spacers 38 having internal screw threads are fitted and fixed by calking in apertures of the bottom portion of inner and outer lever component members 4A and 4B which are joined by connecting bolts 39 threadedly engaged within the spacers 28 to form an operating lever 4 rockable about a center line of the change gear 5.

The brake cover 35 is fixed on its side opposite to the fixed support ring 36 to the frame 12 by means of bolts (not shown). To a pivot shaft 40 rotatably supported in the operating lever 4 is fixed a change pawl metal 8 including a winding-up direction driving pawl 6 and a winding-off direction driving pawl 7 which are detachably engageable with the change gear 5. To the pivot shaft 40 are fixed a handle or knob 42 and an idling change-over preventing engagement member 41 for preventing change-over to idling to be arranged in the close proximity of an outer surface of the engagement flange 24 when the spring supporting member 25 is in an advanced position or brake clamping or operating position.

A channel-shaped journal metal 43 is arranged in the inner lever component member 4A and is fixed thereat by spot welding as shown at 44. A holding member 49 is arranged movable toward and away from the change pawl metal 8 so as to detachably engage a winding-up direction holding engagement portion 46, a winding-off direction holding engagement portion 47 and a neutral position holding engagement portion 48 of the change pawl metal 8 by means of an engagement or urging spring 45 located in the journal metal 43.

A driven shaft 50 is arranged in parallel with and under the driving shaft 1. One end of the shaft 50 is journaled in a bearing 51 in the gear box 14 of which opening is closed by a cover plate 53 fitted therein and the other end is journaled in a bearing 52 in the frame 12. The driven shaft 50 is formed integrally with a load sheave 55 between the frame 12 and cover plate 53 for winding a chain 54 (symbolically shown in a chain line in FIG. 1) thereabout. In the gear box 14, the driven shaft 50 is provided with a large gear 56 fixed thereto adapted to engage a pinion 57 formed in the end of the driving shaft 1.

In FIG. 1, an upper hook 60 is anchored to a hook support metal 58 mounted on a support rod 59 extending between the frame 12 and gear box 14.

The operation of the lever hoist of the first embodiment of the invention is as follows.

First, under a no-load condition the change pawl metal 8 is moved into a neutral position wherein both the winding-up direction driving pawl 6 and winding-off direction driving pawl 7 are not in contact with the change gear 5 and the idling change-over preventing engagement member 41 is moved away from the above mentioned position wherein it is in opposition to the engagement flange 24. Under such a condition, the spring supporting member 25 is restrained by a hand of an operator so as not to be rotated and the brake spring control member 9 now positioned in the braking position is rotated in a brake releasing direction (a direction of an arrow A in FIG. 9) to permit the cam followers 34 to come out of the cams 32 as shown in FIG. 6. As the result, the spring supporting member 25 is moved by the brake clamping spring 10 from the brake clamping position shown in FIG. 8 to the brake releasing position shown in FIGS. 1 and 2, so that the brake clamping spring 10 is released to lower its urging force with the result that the braking assembly is released by the action of the spring 3. Under this condition, therefore, when the spring supporting member 25 is rotated with the gripping portion 23 gripped by the hand of the operator, the load sheave 55 can be freely rotated through the engagement protrusions 29 and 30, the driving member 2, the driving shaft 1 and the gears 57 and 56, thereby effecting a rapid positional adjustment of the load chain 54. In this case, the rotation of the driving member 2 causes the driving shaft 1 to be rotated by the friction of the screw threads of these members because of the no-load condition. Instead of the manually driving the spring supporting member 25, the load chain 54 may be pulled by the hand of the operator to freely rotate the load sheave 55 for its positional adjustment.

Figure 9:
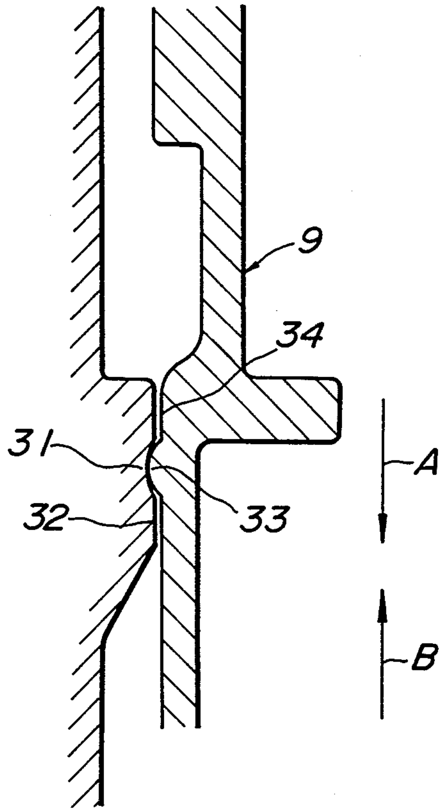
FIG. 9 is a sectional view illustrating the direction change transmission mechanism when the braking assembly is clamped.

The brake spring control member 9 is then rotated from the brake releasing position shown in FIG. 6 to the brake clamping position shown in FIG. 9 in a direction of an arrow B, so that the followers 34 engage the cams 32 to cause the spring supporting member 25 to move into the brake clamping position. Accordingly, the brake clamping spring 10 is compressed to clamp or operate the braking assembly against the action of the spring 3.

Under such a condition, therefore, when the change pawl metal 8 is rotated to bring the winding-up direction driving pawl 6 or winding-off direction pawl 7 into engagement with the change gear 5, a heavy load or even a light load can be securely raised or lowered by repeatedly rocking the operating lever 4.

In this case, moreover, the idling change-over preventing engagement member 41 arranged in the close proximity of the outer surface of the engagement flange 24 prevents the spring supporting member 25 from being rotated and hence moved away from the driving member 2 by an error in lifting and lowering the load.

Figure 10:
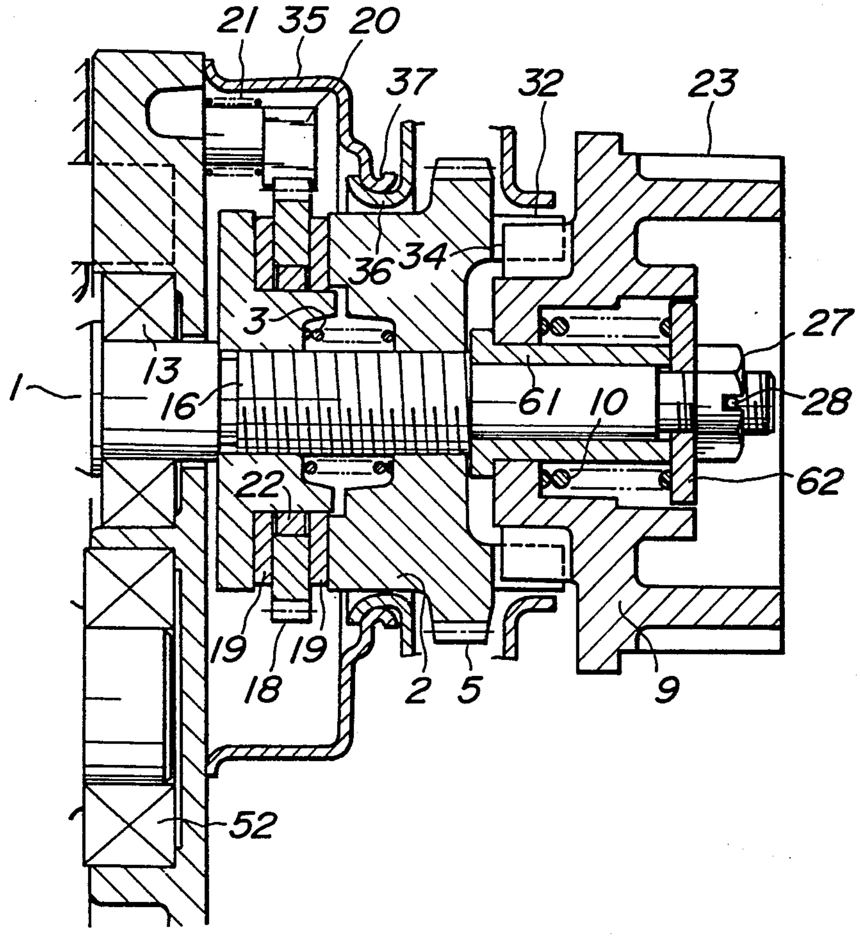
FIG. 10 is a sectional view illustrating a second embodiment of the invention with a braking assembly being released.
Figure 11:
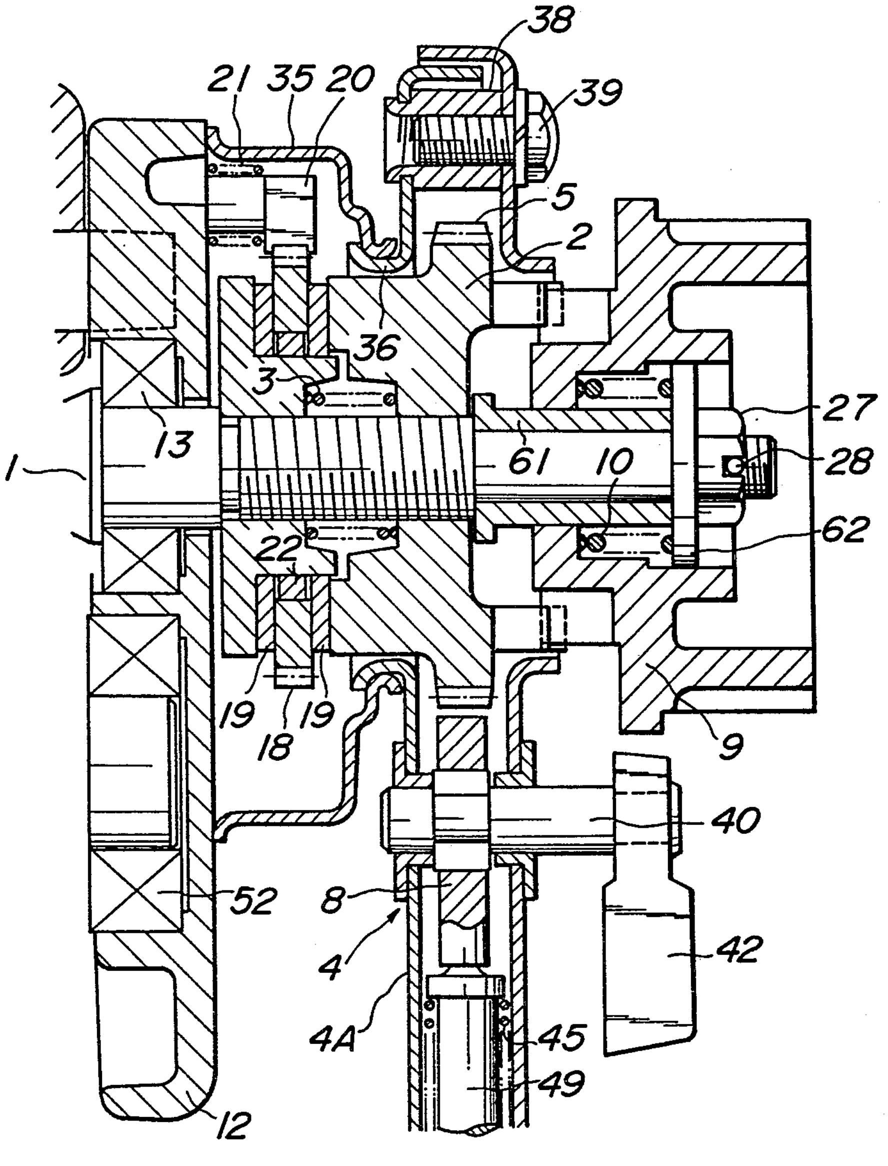
FIG. 11 is a sectional view similar to FIG. 10 but with the braking assembly being clamped.

FIGS. 10 and 11 illustrate a second embodiment of the invention, wherein like components have been designated by the same reference numerals. A driving shaft 1 has at its one end a sleeve 61 fitted thereon and a spring supporting member 62 fitted thereon both fixed thereat by a stopper 27 like a nut locked by a split pin 28. A driving member 2 is provided with cams 32 adapted to engage with cam followers 34 formed on a brake spring control member 9 having a gripping portion 23. A brake clamping spring 10 for a braking assembly is interposed between the spring supporting member 62 and an inner bottom of the spring control member 9. The other construction of the lever hoist of this embodiment is substantially similar to that of the first embodiment.

With the second embodiment, first, a load chain is held to prevent a load sheave, reduction gears, driving shaft 1 and driving member 2 from being rotated and under this condition the brake spring control member 9 is rotated in one or the other direction to compress or release the brake clamping spring 10 thereby clamping or releasing the braking assembly. With the released braking assembly in this second embodiment, the load sheave can be also freely rotated by pulling the load chain.

Figure 12:
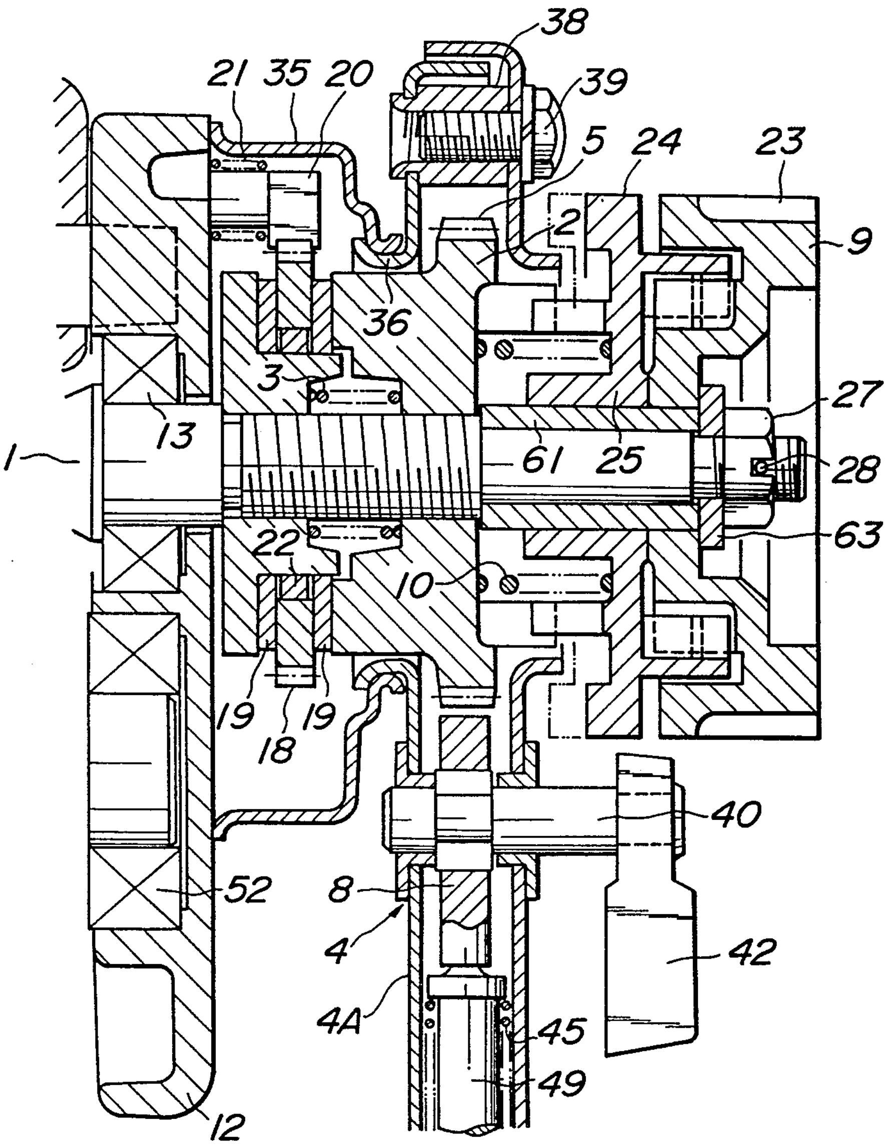
FIG. 12 is a sectional view illustrating a third embodiment of the invention with a braking assembly being released.
Figure 13:
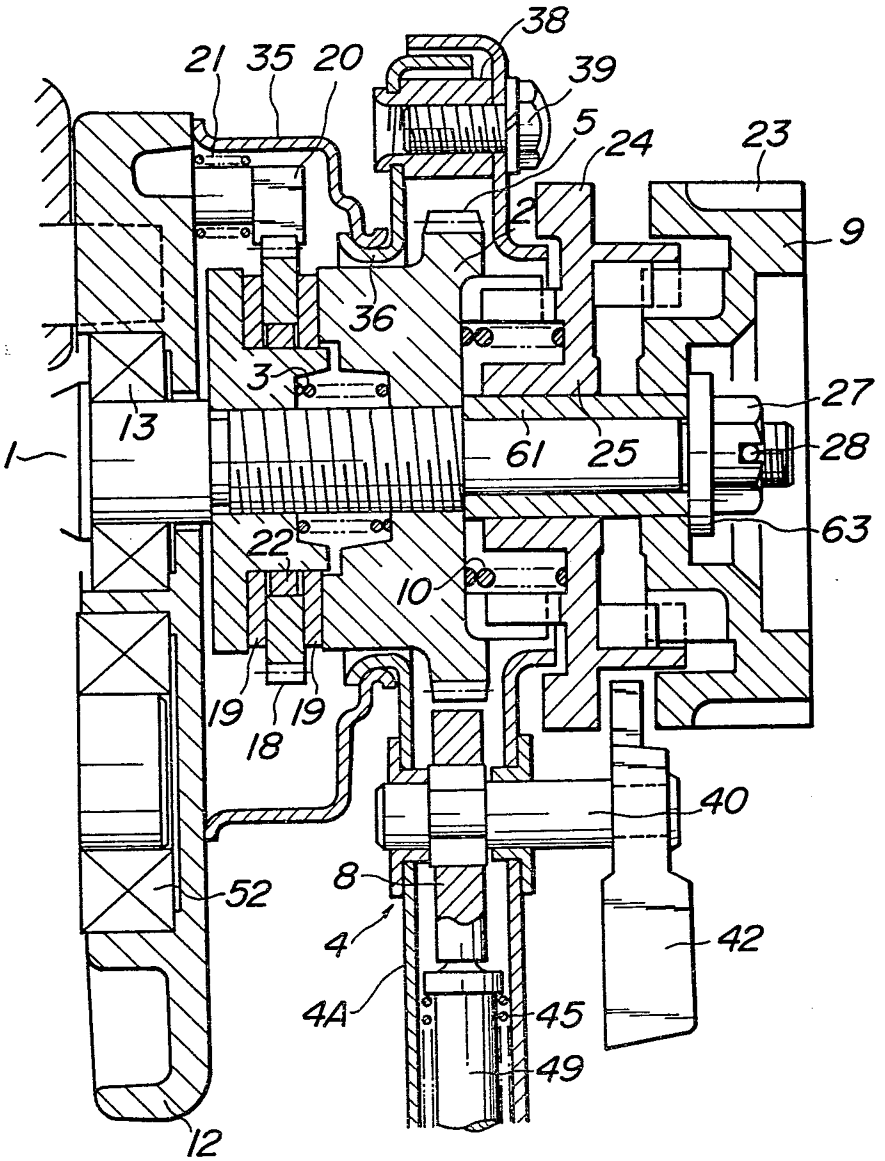
FIG. 13 is a sectional view similar to FIG. 12 but with the braking assembly being clamped.

FIGS. 12 and 13 illustrate a third embodiment of the invention, wherein like components have been designated by the same reference numerals. A driving shaft 1 has at its one end a sleeve 61 fitted thereon and a holding member 63 fitted thereon both fixed thereat by a stopper 27 like a nut locked by a split pin 28. On the sleeve 61 is rotatably fitted a brake spring control member 9 having a gripping portion 23. A spring supporting member 25 having an engagement flange 24 is fitted rotatably and axially slidably on the sleeve 61 between the control member 9 and the driving member 2. The other construction of the lever hoist of this third embodiment is substantially identical with that of the first embodiment.

Figure 14:
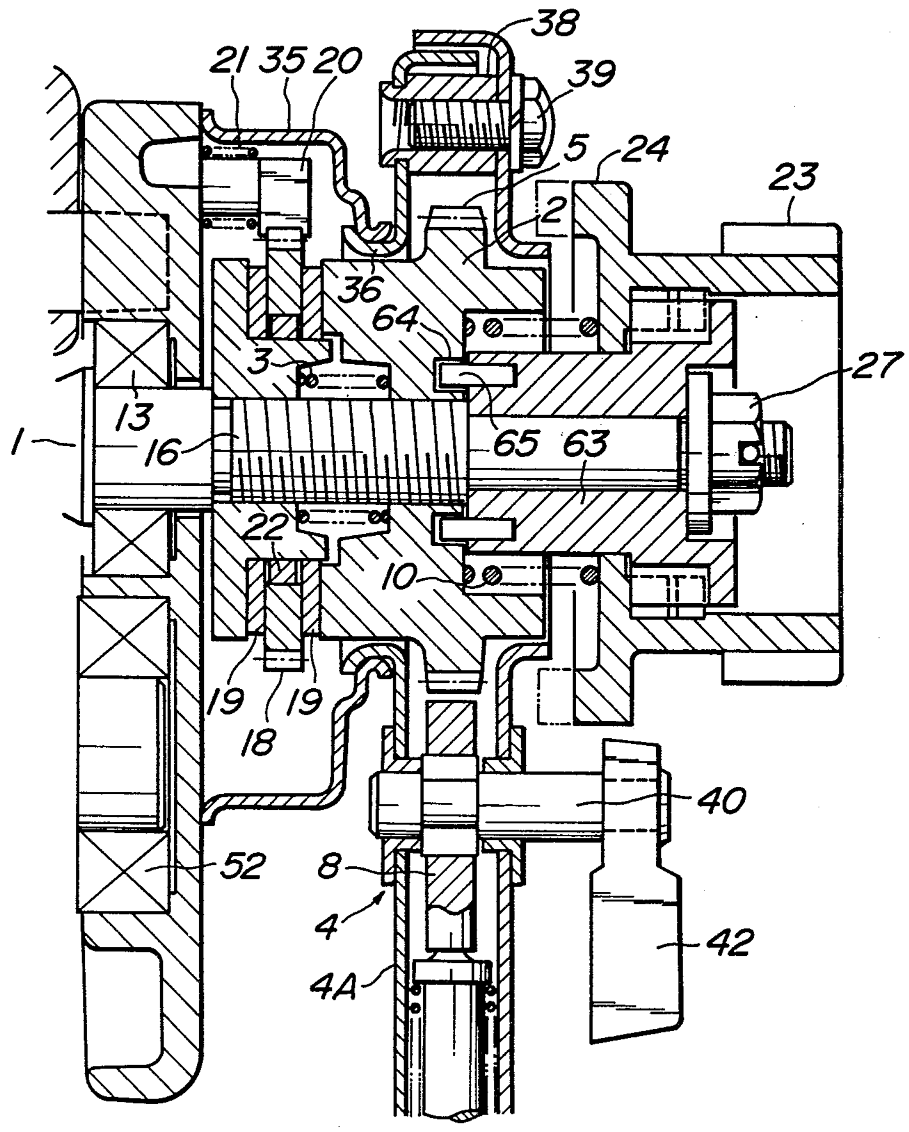
FIG. 14 is a sectional view showing a fourth embodiment of the invention with a braking assembly being released.
Figure 15:
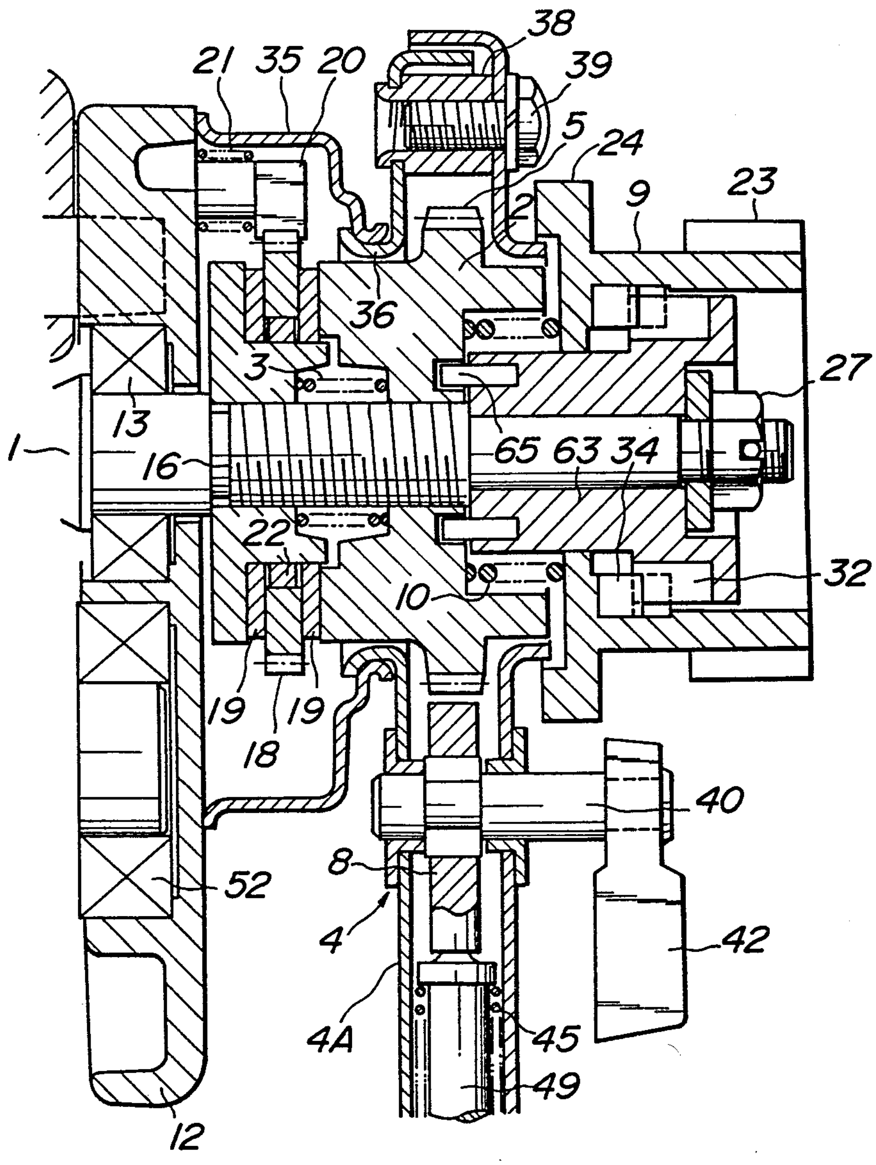
FIG. 15 is a sectional view similar to FIG. 14 with the braking assembly being clamped.

FIGS. 14 and 15 illustrate a fourth embodiment of the invention, wherein like components have been designated by the same reference numerals. On one end of a driving shaft 1 is fitted a holding member 63 which is connected to a driving member 2 against relative rotative movement by means of protrusions 65 of the holding member which extend into engagement holes 64 formed in the driving member 2 on the side in opposition to the holding member 63 fixed to the driving shaft 1 by means of a stopper 27 like a nut locked by a split pin. The holding member 63 has at its outer end a flange formed with cams 32 adapted to engage cam followers 34 formed on a brake spring control member 9. The control member 9 has a gripping portion 23 and is fitted on the holding member 63 rotatably and axially slidably relative thereto. A brake clamping spring 10 is interposed between the driving member 2 and the brake spring control member 9. The other construction of the lever hoist of this fourth embodiment is substantially similar to that of the first embodiment. The operation of the lever hoist of this fourth embodiment is identical with that of the second embodiment.

In carrying out the invention a direction change transmission mechanism different in construction from that of the above mentioned mechanism may be employed for the lever hoist according to the invention. Instead of the elastic resistance member 3, a torsion resistance spring may be used which resists the rotating movement of the driving member 2 in the direction for clamping the braking assembly.

As can be seen from the above description, with the lever hoist according to the invention, the brake spring control member 9 is only rotated in one direction to compress the brake clamping spring 10, so that the compressive force of the spring 10 operates or clamps the braking assembly against the elastic resistance member 3, thereby ensuring the lifting or lowering of even a light load by repeatedly rocking the operating lever 4. The control member 9 is only rotated in the other direction to release the clamping spring 10 and hence the elastic resistance member 3, thereby releasing the braking assembly to make the load sheave freely rotatable.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A lever hoist comprising; a change gear provided on a driving member threadedly engaged on a driving shaft for driving a sheave about which is wound up a chain, rope or the like for a load, an operating lever rockable about said driving member by a hand, a winding-up driving pawl engageable with teeth of said change gear and driven by said operating lever in a winding-up direction for the load, a winding-off driving pawl engageable with the teeth of said change gear and driven by said operating lever in a winding-off direction for the load, a braking assembly preventing said change gear from being driven from a side of said sheave and having an axially operating member directly or indirectly engaging said driving member for releasing said braking assembly, a brake spring control member rotatably fitted on said driving shaft, a brake clamping spring arranged between said driving member and said brake spring control member, a direction change transmission mechanism for transforming rotation of said brake spring control member into axial urging force of said brake clamping spring, a spring supporting member rotatably and axially movably fitted on said driving shaft between said driving member and said brake spring control member for supporting one end of said brake clamping spring, said driving member and said spring supporting being formed on their opposite surfaces with protrusions for transmitting rotative movements with each other, and cams and cam followers being formed on opposite surfaces of said spring supporting member and said brake spring control member, respectively, for moving said spring supporting member to compress or release said brake clamping spring in response to rotation of said brake spring control member in one or the other direction to form said direction change transmission mechanism.

2. A lever hoist as set forth in claim 1, wherein said cams have cam follower riding surfaces and when said cam followers ride on said cam follower riding surfaces said spring supporting member moves to compress said brake clamping spring to clamp said brake assembly and, when said cam followers disengage from said cam follower riding surfaces said brake spring control member moves to release said brake clamping spring to release said braking assembly.

3. A lever hoist as set forth in claim 1, wherein said hoist further comprises a sleeve and a spring supporting member fixedly fitted on one end of said driving shaft, said spring supporting member supporting one end of said brake clamping spring, said brake spring control member being rotatably and axially movably fitted on said sleeve, and cams and cam followers are formed in opposite surfaces of said spring control member and said driving member, respectively for moving said brake spring control member to compress or release said brake clamping spring in response to rotation of said brake spring control member in one or the other direction to form said direction change transmission mechanism.

4. A lever hoist as set forth in claim 3, wherein said cams have cam follower riding surfaces and when said cam followers ride on said cam follower riding surfaces said brake spring control member moves to compress said brake clamping spring to clamp said brake assembly and, when said cam followers disengage from said cam follower riding surfaces said brake spring control member moves so as to release said brake clamping spring to release said braking assembly.

5. A lever hoist as set forth in claim 1, wherein said hoist further comprises a sleeve fixedly fitted on one end of said driving shaft, said brake spring control member being rotatably fitted on said sleeve, and a spring supporting member having an engagement flange fitted rotatably and axially slidably on said sleeve between said brake spring control member and said driving member, said driving member and said spring supporting member being formed on their opposite surfaces with protrusions for transmitting rotative movements with each other, and cams and cam followers are formed on opposite surfaces of said spring supporting member and said brake spring control member for moving said spring supporting member to compress or release said brake clamping spring in response to rotation of said brake spring control member in one or the other direction to form said direction change transmission mechanism.

6. A lever hoist as set forth in claim 5, wherein said cams have cam follower riding surfaces and when said cam followers ride on said cam follower riding surfaces said spring supporting member moves to compress said brake clamping spring to clamp said brake assembly and, when said cam followers disengage from said cam follower riding surfaces said brake spring control member moves to release said brake clamping spring to release said braking assembly.

7. A lever hoist comprising; a change gear provided on a driving member threadedly engaged on a driving shaft for driving a sheave about which is wound up a chain, rope or the like for a load, an operating lever rockable about said driving member by a hand, a winding-up driving pawl engageable with teeth of said change gear and driven by said operating lever in a winding-up direction for the load, a winding-off driving pawl engageable with the teeth of said change gear and driven by said operating lever in a winding-off direction for the load, and a braking assembly preventing said change gear from being driven from a side of said sheave and having an axially operating member directly or indirectly engaging said driving member for releasing said braking assembly, a brake spring control member rotatably fitted on said driving shaft, a brake clamping spring arranged between said driving member and said brake spring control member, a direction change transmission mechanism for transforming rotation of said brake spring control member into axial urging force of said brake clamping spring, said brake spring control member formed as a sleeve fixed to one end of said driving shaft and connected to said driving member against relative rotative movement by means of protrusions of said sleeve which extend into holes formed in said driving member, a spring supporting member rotatably and axially movably fitted on said sleeve for supporting one end of said brake clamping spring, and cams and cam followers formed on opposite surfaces of said spring supporting member and said sleeves, respectively for moving said spring supporting member to compress or release said brake clamping spring in response to rotation of said spring supporting member to form said direction change transmission mechanism.

8. A lever hoist as set forth in claim 7, wherein said cams have cam follower riding surfaces and when said cam followers ride on said cam follower riding surfaces said spring supporting member moves to compress said brake clamping spring to clamp said brake assembly and when said cam followers disengage from said cam follower riding sufaces said brake spring control member moves to release said brake clamping spring to release said braking assembly.

* * * * *